United States Patent Office 3,394,476
Patented July 30, 1968

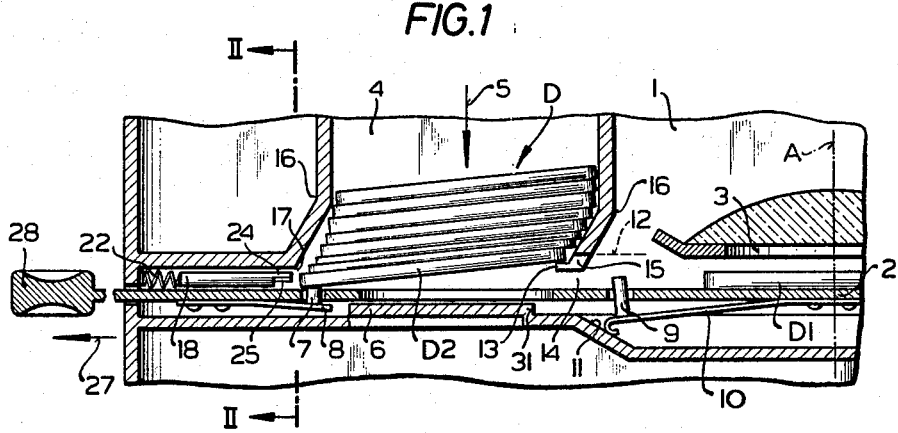
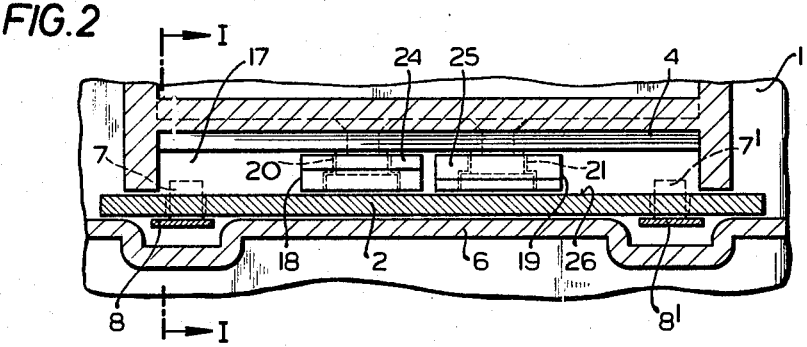
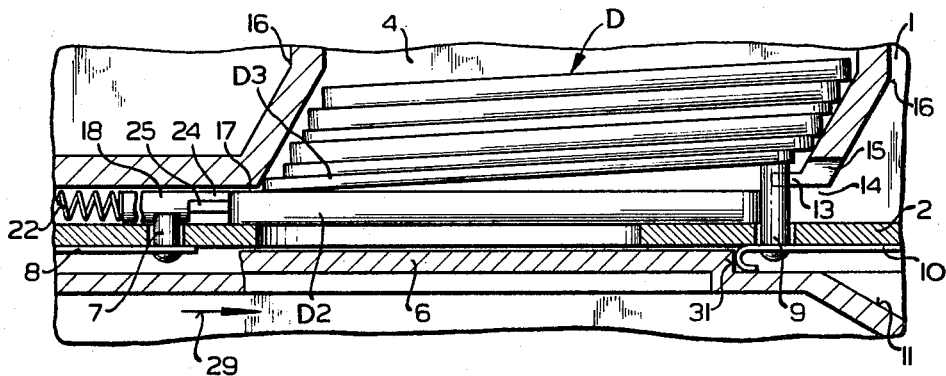

3,394,476
**SLIDE-TRANSPORTING ASSEMBLY FOR PHOTO-
GRAPHIC VIEWERS OR PROJECTORS**
Erich Zillmer, Braunschweig, Germany, assignor to
Voigtlander A.G., Braunschweig, Germany, a corporation of Germany
Filed Feb. 28, 1966, Ser. No. 530,718
Claims priority, application Germany, Mar. 1, 1965,
Z 11,375
4 Claims. (Cl. 40—79)

ABSTRACT OF THE DISCLOSURE

A slide-transporting structure for photographic viewers or projectors. A magazine contains a series of slides which engage each other with the last slide of the series capable of being displaced by a slide-changing means to an imaging position. The next slide of this series engages a magazine projection to be tilted away from the slide which is actually shifted to the imaging position. During the return movement of the slide-changing means a projection thereof engages this next slide to displace it from the magazine projection so that now this next slide will be in a position to be shifted to the imaging position. The projection of the slide-changing means which engages this next slide shifts it into engagement with a stripping means which prevents the last two slides of the series from clinging to each other, so that only displacement of one slide to the imaging position is assured.

---

Figure 4:
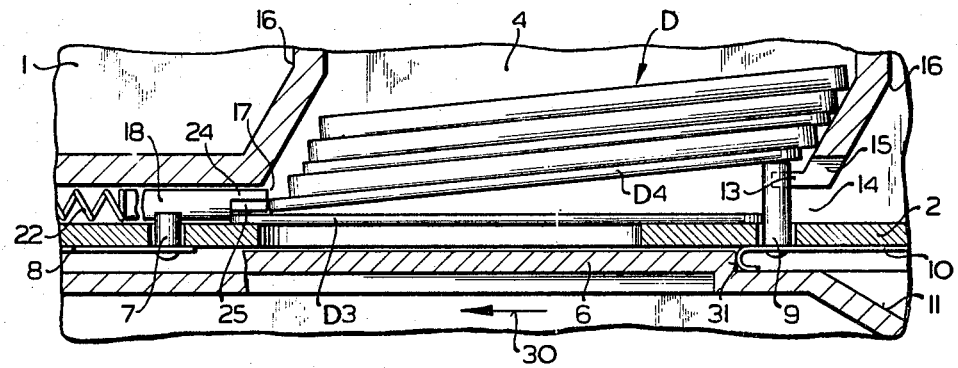

The present invention relates to photographic viewers or projectors.

In particular, the present invention relates to slide-transporting structures for such viewers or projectors.

As is well known in photographic devices of this latter type a series of slides are arranged in a suitable magazine in engagement with each other so that the last slide of the series can be shifted by a slide-changing means from the magazine to an imaging position where an image of the slide is capable of being provided on a suitable viewing screen which in the case of a viewer forms part of the viewer itself and in the case of a projector may be a wall or a separate screen situated distant from the projector.

It is known to provide with such viewers or projectors slide-containing magazines which are either built into the device so as to form a fixed part thereof or which are removably connected thereto. During projection of images from the slides they are arranged in a series engaging each other in the magazine. By means of a slide-changer the slides are successively displaced from the magazine to the imaging position. The series of slides is pressed either toward the slide-changer itself or against a suitable surface by means of a spring or by means of the weight of the series of slides themselves. In the case where the slides are pressed against a suitable surface, this surface uually guides the slide-changer for movement. When the slide-changer is displaced from the magazine to the imaging position, the last slide of the series which is situated next to the slide-changer is engaged by a projection of the slide-changer so as to be shifted with the latter to the imaging position where the slide is releasably retained by springy holding devices. The slide is retained at the imaging position while the slide-changer returns to the magazine. When the slide-changer displaces the next slide to the imaging position, the slide which was previously displaced to the imaging position is displaced away from the imaging position by this next slide, and the last-projected slide is received in a suitable collecting container into which it is pushed by the next slide to be displaced by the slide-changer to the imaging position.

These known structures have several drawbacks. In part the drawbacks result from the fact that either the weight of the entire stack of slides or the force of the spring which presses the slides against each other is applied to the last slide of the series which is displaced by the slide-changer from the magazine to the imaging position, and therefore the slide-changer must exert a force sufficiently great to overcome this pressure of all of the slides on the last slide of the series. The surfaces of the successive slides engage each other over a considerable area, so that there is a considerable frictional resistance to movement of one slide with respect to the next slide, and any lack of smoothness in the exterior surfaces of the slide frames can result in a complete jamming of the structure.

A further source of faulty operation results from the fact that the series of slides in the magazine can have thicknesses which differ considerably from each other. Conventional slide frames have thicknesses of from 1 mm. to approximately 3 mm. The magazine outlet through which the slides pass from the magazine to the imaging position must have a width at least as great as the maximum slide thickness. As a result, it is possible for two or three relatively thin slides to pass unintentionally simultaneously through the outlet of the magazine, in the event that these slides cling with a sufficiently great force to the last slide of the series which is actually engaged and shifted by the slide-changer.

In order to prevent simultaneous passage of more than one slide through the magazine outlet, it is known to arrange at the magazine outlet a springy blocking mechanism which provides a springy closure for the outlet. This springy blocking mechanism must be strong enough to yield during movement of the last slide of the series by the slide-changer from the magazine to the imaging position, but the springy blocking mechanism must not yield to give way to a slide which frictionally clings to the last slide of the series. The blocking mechanism must prevent such a clinging slide from moving with the last slide of the series to the imaging position.

As has been mentioned above, the pressure of the series of slides against each other retards the movement of the slide-changer. Since in addition to overcoming this latter pressure it is also necessary to overcome the spring force of the blocking mechanism, the resistance to movement of the slide-changer can become so great that the entire viewer or projector is shifted during the slide-changing operations.

It is therefore a primary object of the invention to provide a slide-transporting assembly which will avoid the above drawbacks.

In particular, it is an object of the invention to provide a slide-transporting assembly which will reduce the force with which the slides of the series of slides in the magazine press against the last slide of the series which is to be displaced by the slide-changer from the magazine to the imaging position.

In particular, it is an object of the invention to reduce the frictional engagement between the last slide which is actually engaged and transported by the slide-changer and the next-to-last slide which engages the last slide.

Furthermore, it is an object of the invention to render devices such as the springy blocking mechanisms referred to above completely unnecessary.

Thus, the objects of the invention include the provision of a slide-transporting assembly which will reliably transport through the outlet of the magazine only one slide at a time.

In accordance with the invention a magazine means has directed toward the imaging position a wall formed with an outlet through which the last slide of the series passes during movement from the magazine means to the imaging position, and at this latter wall in the region of the outlet thereof the magazine means is provided with a projection extending from the latter magazine wall toward the interior of the magazine means for engaging a slide which is next to the last slide of the series so as to prevent this next slide from moving, at least at its portion which is engaged by this projection, beyond the latter projection toward the slide-changing means.

The invention is illustrated by way of example in the accompanying drawings which form part of this application and in which:

FIG. 1 is a fragmentary sectional plan view of a projector provided with the structure of the invention, the section of FIG. 1 being taken along line I—I of FIG. 2 in the direction of the arrows;

FIG. 2 is a sectional elevation of the structure of FIG. 1, taken along line II—II of FIG. 1 in the direction of the arrows and showing the structure on a scale which is enlarged as compared to that of FIG. 1; and FIGS. 3–6 respectively illustrate part of the structure of FIG. 1 with the parts all in the same position in FIGS. 3–6 but showing how the parts cooperate with different combinations of slides of different thicknesses, respectively.

The drawings fragmentarily illustrate a projector or viewer 1 capable of providing a screen with an image of a slide. These slides are taken one after the other from a series of slides D and are transported, for imaging purposes, by a slide-changing means 2 from the series of slides D to an imaging position where the slides are successively in alignment with an imaging window 3 through which light passes for the purpose of directing an image of the slide to a preselected screen. After being located at the imaging position, the slides are successively deposited in an unillustrated collection container. The light rays move along the path indicated by the dot-dash line A in FIG. 1, this line representing the optical axis of the device.

The series of slides D are situated in a magazine means 4 and the series of slides are urged against each other in the direction of the arrow 5 either as a result of their own weight or as the result of spring pressure. In this way the series of slides is pressed toward the slide-changing means 2 which includes an elongated plate extending transversely of the magazine means 4 and guided for shifting movement to the right and left, as viewed in FIG. 1, by an intermediate wall 6. In order to enable the slide-changing means 2 to displace a slide from the magazine means 4 to the imaging position in alignment with the imaging window 3, the plate of the slide-changing means carries slide-engaging projections which engage a slide and displace it together with the remainder of the slide-changing means. For this purpose the slide-changing means includes, as shown in FIG. 2 as well as in FIG. 1, slide-engaging projections 7 and 7' in the form of pins which are respectively fixed with leaf springs 8 and 8' and which respectively extend through suitable openings of the elongated flat plate of the slide-changing means 2. The leaf springs 8 and 8' are fixed at their ends distant from the pins 7 and 7', respectively, directly to that face of the plate of the slide-changer which is directed away from the slides. These leaf springs seek to situate the slide-engaging projections 7 and 7' in the positions shown in FIG. 2 and illustrated also in FIGS. 3–6.

The slide-changing means 2 has additional slide-engaging projections. These are in the form of a pair of further slide-engaging pins 9 also carried by a pair of leaf springs 10, respectively. The leaf springs 10 are fixed to the slide-changing means in the same way as the leaf springs 8 and they seek to urge the pins 9, respectively, away from the plane in which a slide engaging the slide-changing means is situated. In other words while the springs 8 seek to maintain the pins 7 in a position extending through the openings of the plate of the slide-changer into a plane occupied by a slide, the springs 10, on the contrary, seek to urge the pins 9 away from a position situated in a plane which includes a slide and instead the springs 10 seek to displace the pins 9 to the same side of the slide-changer as that on which the springs 10 themselves are located. The slide-engaging projections 9 only become located in a position for engaging a slide when the springs 10 are displaced, by movement of the slide-changing means 2, into engagement with a camming surface 11 which is formed by a stationary part of the device. During movement of the slide-changing means to the left, which is the return movement of the slide-changing means for engaging the next slide which is to be displaced to the imaging position, the free ends of the springs 10, which are suitably curved, as illustrated, slide along the inclined camming surface 11 until the springs 10 finally reach the positions indicated in FIGS. 3–6. In this position the tips of the projections 9 will extend to the region indicated by the dotted line 12 in FIG. 1.

These slide-engaging projections 9 are functional components of that part of the structure which assures passage of only one slide at a time from the magazine means 4 to the imaging window 3, even though the series of slides D is made up of a number of slides which are of widely different thicknesses. The structure described below prevents, in a simple manner, movement of the slide which is next to the slide to be moved by the projections 7 and 7' to the imaging position unintentionally to the imaging position together with the slide engaged by the projections 7 and 7' as a result of clinging to the latter slide. It is assumed that the series of slides D, corresponding to conditions actually encountered in practice, is made up of slides having cardboard or plastic frames, or situated between glass plates. These slides will of course have different thicknesses resulting from the three sharply different thicknesses of the slide-carrying frames or plates. These thicknesses will be in the ratio of 1:2:3, with respect to each other, so that the slides of maximum thickness are three times as thick as the slides of minimum thickness while the slides of intermediate thickness are twice as thick as the slides of minimum thickness.

One of the important features of the invention resides in providing the magazine means at its wall which is directed toward the imaging position with a projection 13 extending into the interior of the magazine means for engaging a slide therein. This wall which is directed toward the imaging position is of course the right magazine wall shown in section in FIG. 1, and it is this latter wall of the magazine means which is formed with the outlet 14 through which the slides successively pass during displacement by the slide-changing means 2 from the magazine means 4 to the imaging position in alignment with the imaging window 3. This outlet 14 has a cross sectional configuration conforming to the cross section of the slides so that the outlet 14 is of an elongated rectangular configuration, and the projection 13 is in the form of an elongated rib extending along an elongated edge of the wall of the magazine means which defines the opening 14, this latter edge being spaced from the slide-changing means 2. Thus, the projection 13 is in the form of an elongated rib extending inwardly toward the interior of the magazine means from an elongated edge thereof which defines part of the opening 14, and in this way the rib 13 forms a stop for engaging an edge of a slide before the latter edge can continue to advance toward the slide-changing means 2. The outlet 14 of course has a thickness or width which is large enough to permit the slides of maximum thickness to pass therethrough. The elongated edge of the magazine wall which is formed with the outlet 14 and in the region of which the projection 13 is located is formed with a pair of notches 15 providing clearance for the slide-engaging projections 9 which will move through these notches 15, respectively, in connection with operation of the slide-changing means 2.

The magazine means 4 has a second wall opposed to the wall thereof which is formed with the outlet 14, and these magazine walls, shown in section in FIG. 1, have parallel intermediate portions spaced from the slide-changing means 2 and extending perpendicularly with respect to the latter. These walls also have, respectively, terminal portions extending from their intermediate portions toward the slide-changing means 2, and these parallel terminal wall portions extend angularly with respect to the intermediate parallel wall portions so as to provide the walls with the angled portions 16 indicated in FIG. 1. As the slides advance toward the slide-changing means 2, they move past the angled portions 16 of the magazine walls and are thus transversely displaced through a short distance one with respect to the other, so that in this way a loosening of the series of slides is achieved. As a result the force with which the successive slides cling one to the other is reduced.

Furthermore, the lateral shifting of a slide next to the slide-changing means 2 with respect to the centerline of the series of slides, determined by the center of gravity of the series of slides when they press against each other due to their own weight or by the central line of force of the springs which act in the direction of the arrow 5, results in a smaller pressure acting on that edge of a slide which engages the slide-changing means 2 than that edge of the same slide which engages the projection 13. The result is a reduction in friction resulting from movement of the slide-changing means with respect to the slide which does not yet move together with the slide-changing means.

The second wall of the magazine means, shown in section in FIG. 1 and extending parallel to that wall which is formed with the outlet 14, is formed at its angularly extending terminal portion, opposite from and in alignment with the outlet 14, with a slide-receiving recess 17 into which the slides can successively enter, in part. The width of the recess 17 is great enough to permit entry of a slide of maximum thickness. A slide-stripping means is situated in the recess 17, and this slide-stripping means is composed, as shown particularly in FIG. 2, of a pair of slide-stripping members 18 and 19 which extend parallel to each other and which are individually guided for movement in a direction parallel to the direction of movement of the slide-changing means. For this purpose a pin-and-slot guiding structure 20 is provided for the slide-stripping member 18 while a similar pin-and-slot guiding structure 21 is provided for the slide-stripping member 19. Thus, these latter members will be formed with elongated slots which receive the guide pins and the length of the slots in cooperation with the locations of the guide pins will determine the extent of possible longitudinal movement of the elongated slide-stripping members 18 and 19. These slide-stripping members are carried by an end wall of the magazine means which extends parallel to and is spaced from the slide-changing means to define part of the recess 17. A pair of compression springs 22 and 23 are also situated in the recess 17, and these springs respectively press against the slide-stripping members 18 and 19 for urging them to the right, as viewed in FIG. 1, and the extent of movement of the pair of slide-stripping members in this direction is of course limited by engagement of the left ends of their slots with the guide pins. The slide-stripping members 18 and 19 are respectively provided with slide-stripping end portions 24 and 25 directed toward the interior of the magazine means and extending parallel to the slide-engaging surface 26 (FIG. 2) of the slide-changing means. These stripping end portions 24 and 25 are of different thicknesses, as is clearly apparent from FIG. 2, so that they define with the surface 26 gaps of different thicknesses adapted respectively to receive slides of different thicknesses. Thus, a gap of minimum thickness, corresponding to the thickness of a slide of minimum thickness, is defined between the stripping end portion 25 and the surface 26, while the stripping end portion 24 and the surface 26 define between themselves a gap whose thickness corresponds to that of a slide of intermediate thickness.

The above-described structure operates in the following manner:

The slide-changing means 2 is shown in FIG. 1 in an intermediate position moving in the direction of the arrow 27 along its return stroke from the imaging position to the magazine means 4 in preparation for engaging the next slide which is due to be displaced from the magazine means 4 to the imaging position in alignment with the imaging window 3. During the previous operating cycle the slide-engaging projections 7 and 7' displaced the slide D1 to its imaging position in alignment with the imaging window 3, and the slide D1 is retained in its imaging position by unillustrated clamping springs. The slide-changing means 2 includes a handgrip 28 accessible to the operator for manual actuation of the slide-changing means, although, if desired, any motor or the like can be connected through a suitable transmission to the slide-changing means for providing a power actuation thereof.

After the slide D1 has been displaced out of the magazine means, a slide D2 of maximum thickness rests with one of its edges against the projection 13 of the magazine means 4 and with the other of its edges against the moving slide-changing means 2 which of course moves at this time with respect to this next slide D2. During the return movement of the slide-changing means, illustrated in FIG. 1, the pins 7 and 7' will be pressed in opposition to the springs 8 and 8', respectively, by the slide D2 itself out of the plane occupied by the slide until these pins move beyond the edge of the slide which engages the returning slide-changing means. At this point the pins 7 and 7' are snapped back by the springs 8 and 8', respectively, to their locations extending through suitable openings of the slide-changing means into the plane occupied by the next slide which is to be projected. The pins 7 and 7' project beyond the surface 26 into the plane occupied by the slides by a distance only great enough to enable the pins 7 and 7' to engage a slide of minimum thickness. In other words the free ends or tips of the pins 7 and 7' never project beyond the surface 26 by a distance greater than the thickness of the slides of minimum thickness.

The leaf springs 10 have, as shown in FIG. 1, been displaced into engagement with the inclined camming surface 11 so that during the continued return movement of the slide-changing means beyond the position thereof shown in FIG. 1 these leaf springs 10 are continuously displaced toward the slide-changing means so that the slide-engaging projections 9 will be displaced to the position where their tips are in the region of the dotted line 12 shown in FIG. 1. After the projections 9 pass through the notches 15, respectively, they engage the slide D2 and shift it away from the projection 13, to the left as viewed in FIG. 1. The slide D2 can now continue its movement toward the slide-changing means 2, at that edge of the slide D2 which previously engaged the stop 13, so that the slide D2 now is in full engagement with the slide-changing means, and at the same time it has been displaced to the left into engagement with the stripping end portions 24 and 25 of the slide-stripping members 18 and 19 which are now displaced to the left in opposition to the springs 22 and 23. The return movement of the slide-changing means is limited by engagement of the free ends of the leaf springs 10 with a stationary stop 31. The parts have now reached the position indicated in FIG. 3.

It is not possible for the slide D3 of minimum thickness, which follows the slide D2 of maximum thickness, to follow the slide D2 and participate in its movement into the recess 17, because this latter recess has a cross section corresponding to the thickness of a slide of maximum thickness and therefore the recess 17 will have its cross section substantially filled by the slide D2, so that an additional slide cannot move into the recess 17. As a result this next slide D3 remains held in the position shown in FIG. 3 by the wall of the magazine means which is shown at the left in FIG. 3. The slide-changing means 2 is now shifted in the direction of the arrow 29 so as to move the slide D2 into the imaging position, and of course the slide-engaging projections 7 and 7' will engage the slide D2 so as to displace the latter together with the remainder of the slide-changing means to a position where the slide D2 will be in alignment with the imaging window 3. As the slide D2 approaches the window 3 it will engage the slide D1 which remains at the imaging position and will then displace the slide D1 away from the imaging position into the unillustrated collection container. Of course, during this movement of the slide-changing means in the direction of the arrow 29 (FIG. 3) the springs 10 displace the projections 9, toward and beyond the positions thereof indicated in FIG. 1, away from the slide D2, and of course they also become displaced away from the slide D3 which thus can rest at its right edge, as viewed in FIG. 3 against the projection 13.

When the slide-changing means 2 has again returned to its initial position, the conditions will be those shown in FIG. 4. During this next return movement of the slide-changing means in the direction of the arrow 30 of FIG. 4, the slide-engaging projections 9 have again been displaced, by cooperation of the camming surface 11 with the springs 10, until they assume a position where their left sides, as viewed in FIG. 4, engage the slide D3 of minimum thickness and displace it from the projection 13 so that this slide D3 of minimum thickness can now continue to move, at its edge previously resting against the projection 13, toward the slide-changing means so as to be in full engagement therewith. This slide of minimum thickness can of course be displaced by the projections 9 into the gap defined between the stripping end portion 25 and the surface 26, this being the gap of minimum thickness as pointed out above. The slide D3 can move into this gap without displacing the stripping member 19. The slide D4, which follows the slide D3, and which in the illustrated example happens also to be a slide of minimum thickness, tends to move together with the slide D3 as a result of its frictional clinging thereto, but this next slide D4 engages the stripping projection 25, and since the force with which the slide D4 clings to the slide D3 is less than the force required to displace the stripping member 19 in opposition to the spring 23, the stripping end portion 25 is not displaced and instead retains the slide D4 in the position illustrated in FIG. 4 while the slide D3 continues to be displaced by the pins 9 into the gap between the end portion 25 and the surface 26. Thus, this prevention of movement of the next slide D4 by the stripping member 19 results in stripping of this next slide from the slide D3 to guarantee separation of the slides. Therefore, with the structure of the invention even in the case where a pair of slides of minimum thickness are directly in engagement with each other, it will only be possible for the structure to transport a single slide at one time through the outlet 14.

Figure 5:
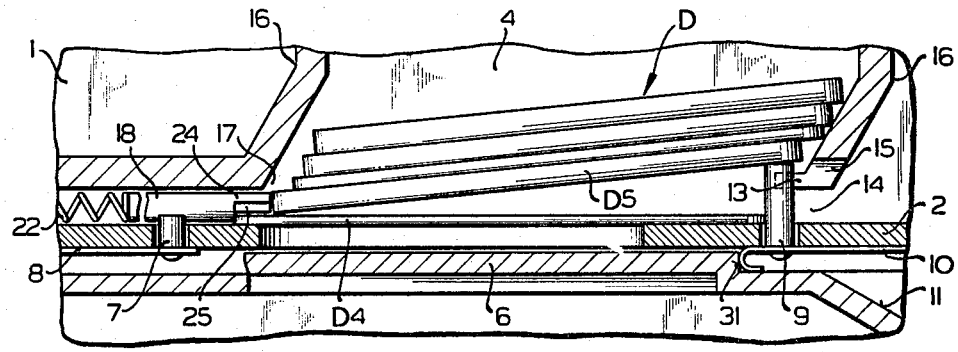

FIG. 5 shows the conditions which obtain at the end of the next return stroke of the slide-changing means. It is apparent that now the slide D4 has reached its position of full engagement with the slide-changing means, which was the position previously occupied by the slide D3. In the illustrated example a slide D5 of intermediate thickness happens to be following the slide D4, so that it is this next slide D5 of intermediate thickness which will come into engagement with the projection 13. This slide D5 of intermediate thickness will engage the stripping end portions 24 and 25 to be prevented by the latter from moving together with the slide D4 into the recess 17, so that in this way the stripping means strips the slide D5 from the slide D4. In this case also the force with which the slides cling to each other is insufficient to displace the strippers 18 and 19 in opposition to the springs 22 and 23, respectively. Therefore, in this case also only the single slide D4 will be displaced through the outlet 14 to the imaging position during the next operating cycle of the slide-changing means.

Figure 6:
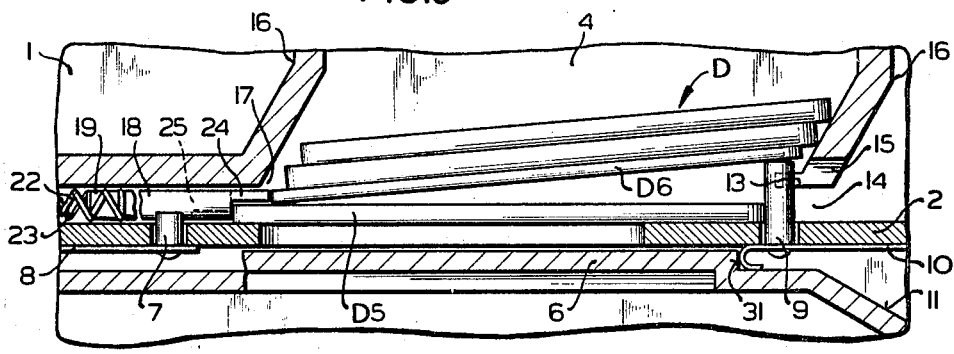

At the end of the next return stroke of the slide-changing means, the conditions shown in FIG. 6 will obtain. During this latter return stroke the slide-engaging projections 9 have displaced the slide D5 of intermediate thickness away from the projection 13 so that this latter slide is now in full engagement with the slide-changing means 2. The slide D5 has thus moved into engagement with the stripping end portion 25 of the stripping member 19 and now, as a result of displacement by the projections 9, the stripping member 19 is indeed displaced in opposition to the spring 23 while the stripping member 18 remains in its initial position. The slide D5 does not displace the stripping member 18 inasmuch as the gap between the stripping end portion 24 and the slide-changing means 2 is great enough to accommodate the slide of intermediate thickness. Therefore, this stripping end portion 24 is still in its stripping position for engaging the next slide D6 which happens to be a slide of minimum thickness, so as to prevent this latter slide from entering together with the slide D5 into the recess 17, and in this way the next following pair of slides are stripped one from the other. Thus, with the particular series of slides of different thicknesses as shown in FIG. 6, displacement of only one slide through the outlet of the magazine means during the next cycle of the slide-changing means is assured.

What is claimed is:

1. In a slide-transporting assembly, for viewers or projectors, magazine means for containing a series of slides in engagement with each other with the last slide of the series in a position to be displaced from said magazine means to an imaging position, slide-changing means shiftable transversely of said magazine means for engaging said last slide of the series and shifting it from said magazine means to said imaging position, said slide-changing means then returning to engage the next slide of the series in preparation for shifting the next slide to the imaging position, said magazine means having a first wall directed toward said imaging position and formed with an outlet through which the last slide of the series passes during movement from said magazine means to said imaging position, and said first wall of said magazine means having spaced from said slide-changing means an elongated edge defining at least part of said outlet, said magazine means having in the region of said edge of said first wall a projection extending from said first wall inwardly toward the interior of said magazine means for engaging an edge of a slide next to the last slide of the series to prevent said latter edge of said next slide from advancing beyond said projection toward said slide-changing means, said slide-changing means including a slide-engaging projection which, during return movement of said slide-changing means, engages said next slide and displaces the latter from said projection of said first wall so that said next slide can then move at said edge thereof toward said slide-changing means, said magazine means including a second wall opposed to said first wall which is formed with said outlet and formed with a slide-receiving recess situated opposite to said outlet and communicating with the interior of said magazine means, said slide-engaging projection of said slide-changing means when displacing a slide from said projection of said first-mentioned wall of said magazine means continuing to displace the latter slide into said slide-receiving recess of said second wall, and slide-stripping means situated in said recess for engaging a slide next to the last slide of the series for stripping said next slide from the last slide of the series during movement of the last slide of the series into said recess.

2. The combination of claim 1 and wherein said first and second walls respectively have elongated parallel intermediate portions which extend substantially perpendicularly with respect to said slide-changing means and said walls respectively having between said intermediate portions thereof and said slide-changing means parallel terminal portions which extend angularly from said intermediate portions toward said slide-changing means.

3. The combination of claim 1 and wherein said stripping means includes stripping end portions directed toward the interior of said magazine means and respectively adapted to cooperate with slides of different thicknesses.

4. The combination of claim 3 and wherein said stripping means includes a pair of elongated stripping members, a pair of springs opposing movement of said members away from the interior of said magazine means, and a pair of stripping end portions respectively fixed to said stripping members and projecting therefrom toward the interior of said magazine means, said stripping portions respectively being situated at different distances from said slide-changing means to define with the latter gaps of different widths adapted to receive slides of different thicknesses, respectively.

References Cited

UNITED STATES PATENTS

| 2,922,335 | 1/1960 | Lacoe | 40—78 XR |
| 3,273,454 | 9/1966 | Bast | 40—79 XR |

EUGENE R. CAPOZIO, *Primary Examiner.*

WILLIAM H. GRIEB, *Assistant Examiner.*